UNITED STATES PATENT OFFICE 2,299,288

SUGAR

Robert Whymper, New York, N. Y., assignor to The National Sugar Refining Company, Edgewater, N. J., a corporation of New Jersey No Drawing. Application March 21, 1940, Serial No. 325,129

6 Claims. (Cl. 127—30)

The invention is an improvement of certain types of sugar which are not available for convenient use owing to their sticky nature and tendency to solidify or cake, which is due to the presence, on the surfaces of the sugar or sucrose crystals in such sugars, of films of invert sugar, molasses, caramel, glucose, gums, proteins, salts or like normally uncrystallized, hygroscopic, melassigenic and sticky matters usually representing the residue of the raw syrups from which such sugars are made and in any event desirably present on account of their special properties, flavor, etc. Among such sugars are included the raw cane and beet sugars of commerce, which usually show by analysis more than 90% and less than 99% of sucrose, the remainder being the less easily crystallizable substances responsible for the stickiness. Other forms of such sugars are the ordinary "brown" and "soft" sugars of commerce which usually analyze, for refiners' light brown soft sugars, 92–90% sucrose, 1–1.5% invert, 5.5–4.5% water, 0.1–0.2% ash (mineral salts)—or, for refiners' dark brown soft sugars, 85–83% sucrose, 6.0–6.5% invert, 5.5–4.5% water, 1.75–2.0% ash (mineral salts). These types of sugar, while being capable of being partially dried out, readily reabsorb moisture from the air, again becoming soft and sticky, but, under fluctuating atmospheric conditions, eventually cake into solid, hard lumps inconvenient for commercial handling or in the household.

The purpose of this invention is to render such sugars non-caking and free-flowing without impairing their purity, quality or flavor thus making them available for many uses for which they are not now employed; for example, this process converts ordinary brown sugar to a form or condition in which it can be sprinkled from a spoon like ordinary granulated sugar, remaining in this state indefinitely.

I have found that if the individual sticky crystals or particles of such sugars are brought into contact with smaller dry particles, of sucrose for example, in such manner that the small dry particles stick to the others covering them on all sides as coatings, the stickiness can be effectually masked and eliminated and without using so much of the fine coating particles as to affect the flavor or adversely affect the color. The result is that such normally sticky sugars are brought to a condition in which they can be packed or stored, even in paper boxes, without caking to any greater extent than pure sucrose or ordinary granulated sugar and the usefulness of these sugars is thus correspondingly extended.

This effect is due in part to the fact that during the process of preparation some of the added sucrose dissolving in the sticky film raises the crystallizable sucrose content of the latter, thereby inducing the formation of surface crystals out of the film itself, the presence of which crystals reduces the tendency to adhere, and it is also due in part to the fact such of the fine particles as are not absorbed into the film adhere to it and serve to separate or space apart the larger particles keeping them from sticking, but, in any event, only small percentages of the fine particles are required and not enough to alter the essential character of the goods.

I find that smaller amounts of the coating material are required in proportion to its fineness, other conditions being constant. With coating material consisting of particles that passed a Tyler 300 screen, about 5%, by weight, was sufficient to render ordinary raw sugar, (sucrose content 96%), free-flowing and non-caking and, as stated, with no effect on the flavor or objectionable effect on its appearance. In the case of refiners' dark brown soft sugar which is extremely sticky, 10% of sucrose powder of the same degree of fineness sufficed to produce a dry non-hygroscopic coating effect that made the finished product free-flowing under even damp conditions. These examples are only illustrative and are in no way definitive of the amount of the fine stuff required, which obviously varies with circumstances.

The application of the fine particles to the larger particles can be carried out in an ordinary mixer, revolving pan, helical conveyor, beater-trough or other form of agitator, by means of which the mass of sticky sugar under treatment can be shaken apart or shredded or otherwise divided up into small particles, such apparatus being desirably covered over to prevent escape of dust. While thus loosened up and in motion the fine stuff is applied by a blast nozzle, jigger sieve, or other appropriate means until the mass is seen to have become dry and free-flowing, when the feeding is stopped. With care the operation can be done so as to cover each sticky particle with a powder coat and without excess of the finer particles, but any excess can be readily removed by simple screening or by a strong current of air.

The size of the resulting dust-coated particles is determined by the conditions of the separating process as well as the temperature and the nature of the sticky films in the soft sugar, and may be represented, as in the case of raw sugar, by individual crystals of sucrose, each powder-coated, in which case the product compares in size to ordinary granulated sugar, or it may be represented by agglomerates of the same or smaller crystals, stuck together by virtue of their films, each agglomerate in this case being covered over with the powder coat, but in all cases, whether formed of powder-coated single crystals or powder-coated agglomerates the particle size ranges from about that of ordinary builder's sand to coarse sand or fine gravel, or such as can be readily sprinkled on food and, in all cases and as will be understood, the fine stuff is composed of particles which are much finer than either the small agglomerates or the individual crystals of the sticky sugar treated. Those skilled in the art will readily understand how to separate the sugar to the particle-size required and that the product can be classified if required to meet any particular specifications.

Dextrose and other dry, non-hygroscopic and non-sticky sugars or combinations of them, if sufficiently finely divided, can be used with or in place of the sucrose dust, and if anhydrous dextrose is used an additional advantage is gained from the fact that it will absorb water from the sticky film, or atmosphere, and combine with it to form hydrated dextrose, itself a dry sugar, which masks the stickiness. Generally speaking, less of this dextrose is needed, as compared to sucrose, to produce the product.

In cases where the hygroscopic sugars to be treated are fairly dry and apparently non-sticky by reason of dry atmosphere at the moment, or of their relatively high sucrose content, it is sometimes desirable in the preparation of the new products, first to dampen the surface of the sugar crystals with water, steam, or sugar solutions, before applying the dust particles and, in other cases, where the moisture content of the sticky or hygroscopic surfaces of the sugar crystals is unduly high for any reason, it may be necessary or found desirable to dry out the finished product before placing it in the sacks, or other packages; but, thereafter, the finished product, prepared as described, will remain normally dry, non-hygroscopic and substantially free-flowing.

I claim:

1. As a new form of sugar, a granular composition comprising particles of crystalline non-hygroscopic sugar in the general size range of sugars adapted to be sprinkled on food, covered over with non-crystallizable sticky films of highly hygroscopic nature and further covered with dust coatings of much finer and dust-like particles of non-hygroscopic sugar adherent to such sticky films to an extent overcoming the stickiness and rendering the mass free-flowing and non-caking.

2. As a new form of sugar, a granular composition comprising particles of crystalline sugar in the general size range of sugars adapted to be sprinkled on food, covered over with non-crystallizable sticky and flavor-containing films of highly hygroscopic nature, and further covered with coatings of much smaller particles of non-hygroscopic sugar not exceeding 300 Tyler screen, adherent to such sticky films to an extent rendering the mass free-flowing and non-caking.

3. As a new form of sugar, a granular composition comprising crystalline sucrose particles in the general size range of sugars adapted to be sprinkled on food, covered over with films of the mother liquor of the crystal, and further covered with coatings of fine sucrose particles not exceeding 300 Tyler screen, adherent to such sticky films to an extent overcoming the stickiness and rendering the mass free-flowing and non-caking.

4. The process of treating sugar of the kind which is composed of non-hygroscopic crystals normally adherent to each other by virtue of the presence on the crystals thereof of sticky films of uncrystallized or normally uncrystallizable and highly hygroscopic matter, which comprises dividing such sugar into separate particles or small crystal agglomerates in the general size range of sugars adapted to be sprinkled on food, and agitating such particles in the presence of much smaller and dust-like particles of a dry non-hygroscopic sugar thereby causing the latter to adhere to and form non-sticky coverings on the larger particles, and ceasing such treatment as soon as the mass becomes free-flowing and non-caking in character.

5. The process of treating brown or soft sugars of the kind consisting of sucrose crystals normally adherent to each other by virtue of the presence on the crystals thereof of sticky films of normally uncrystallizable mother liquor, which comprises dividing such sugar into separate particles or small crystal agglomerates in the general size range of sugars adapted to be sprinkled on food, and agitating such particles in the presence of much smaller and dust-like particles of a dry non-hygroscopic sugar adapted to adhere to and form non-sticky coverings on said larger particles, and ceasing such treatment as soon as the mass becomes free-flowing and non-caking in character.

6. As a new form of sugar, a granular composition comprising particles of crystalline sucrose, in the general size range of sugars adapted to be sprinkled on food, such particles being covered over with non-crystallizable or sticky flavor-containing films of highly hygroscopic nature, and further covered with coatings of finely ground and much smaller dust-like particles of substantially non-hygroscopic sugar adherent to such sticky films to an extent overcoming the stickiness thereof and rendering the mass free-flowing and non-caking.

ROBERT WHYMPER.